United States Patent [19]

Cappel

[11] 4,265,123
[45] May 5, 1981

[54] MOTION LIMITING APPARATUS

[75] Inventor: Klaus L. Cappel, Madison, Ala.

[73] Assignee: Wyle Laboratories, El Segundo, Calif.

[21] Appl. No.: 30,163

[22] Filed: Apr. 16, 1979

[51] Int. Cl.³ .............................................. G01N 29/04
[52] U.S. Cl. ........................................... 73/663; 248/1
[58] Field of Search .......................... 73/663, 665, 662; 248/607, 608, 1; 108/48

[56] References Cited

U.S. PATENT DOCUMENTS

| 1,111,151 | 9/1914 | Heartman | 108/48 |
|---|---|---|---|
| 1,420,206 | 6/1922 | Milam | 108/48 |
| 2,460,712 | 2/1949 | Peterson | 108/48 |
| 2,784,004 | 3/1957 | Hamrick | 108/48 |

Primary Examiner—Anthony V. Ciarlante
Attorney, Agent, or Firm—Freilich, Hornbaker, Wasserman, Rosen & Fernandez

[57] ABSTRACT

A simple torque tube device which can be used in a shake table system to prevent rotation of the table about a predetermined axis without restricting the table in other degrees of freedom. A torque tube device which can prevent table rotation about a horizontal axis, includes a horizontal tube lying below the table, and a pair of largely vertical links having lower link ends pivotally connected to arms which lie at opposite ends of the tube and upper link ends pivotally connected to the table.

14 Claims, 12 Drawing Figures

MOTION LIMITING APPARATUS

BACKGROUND OF THE INVENTION

Object movement is commonly considered to occur in six degrees of freedom, these being linear movement along three perpendicular axes X, Y, and Z, and rotation about these three axes. A number of machines, such as milling machines and vibration testing machines, utilize a workpiece-holding table which must be moved in a limited number of degrees of freedom and which must be prevented from movement in other degrees of freedom.

One approach to table mounting is the cascade approach, sometimes called the "table-on-table" system, which is used in milling machines. In this approach, the workpiece-holding table is supported on a second table having a pair of parallel guides that prevent movement in five degrees of motion and allow movement in only one X-axis direction. The second table is supported on a third table that prevents movement in all but one Y-axis direction, etc. Additional intermediate tables can be used that each prevent movement except rotation about one axis. The main disadvantages of the cascade system are its large weight and the high costs of the numerous bearings.

Another approach to table mounting is the coupled approach, which is the most widely used approach in vibration tables used for seismic testing. Such a system may use a pair of synchronized hydraulic actuators to produce vertical motion without tilting of the table about a particular horizontal axis. Undesired rotational and linear translations are prevented by the use of horizontal links with outer ends pivotally connected to the table and inner ends pivotally connected to a reaction mass. While a coupled system is relatively simple, it has several disadvantages, including the need for a large reaction mass due to the horizontally extending links, the presence of a low natural frequency of vibration for a tall specimen due to compressibility of hydraulic fluid in the two actuators, and the sometimes undesirable arcing motion of the table due to the pivotally mounted links.

An object moving system which was especially simple, required a minimal reaction mass, had a low natural frequency, and avoided considerable arcing movement, would be of considerable value in a variety of applications, especially in the construction of vibration tables.

SUMMARY OF THE INVENTION

In accordance with one embodiment of the present invention, an object moving and motion limiting apparatus is provided, which is of relatively simple design and yet which provides close control of object movement. The apparatus includes a rotatably mounted torque resisting member, such as a tube, and a pair of links with inner ends connected to opposite ends of the tube and outer ends connected to the table. The tube and link assembly prevents table rotation about an axis which is perpendicular to the axis of the tube, without interfering with other degrees of freedom of table motion.

In one system designed to enable table motion along a vertical or Z axis while preventing rotation about horizontal X and Y axes, a pair of anti-torque assemblies are utilized. Each assembly includes a torque tube located under the table and connected by a pair of largely vertical links to the table. The two tube axes extend parallel respectively to the Y and X axes, to respectively prevent table rotation about the X and Y axes. A single vertical actuator can be utilized to produce motion along the vertical or Z axis.

Air bags or other devices utilized to minimize downward force on the vertical actuator, can be coupled to a torque tube. The fact that the tube pivots without undergoing lateral movement, even where the table undergoes lateral movement, results in absence of sideward loading on the air bags. Also, the air bags can bear against tube locations radially closer to the tube axis than the lower ends of the links, so that the bags do not have to undergo the same vertical motion as the table.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
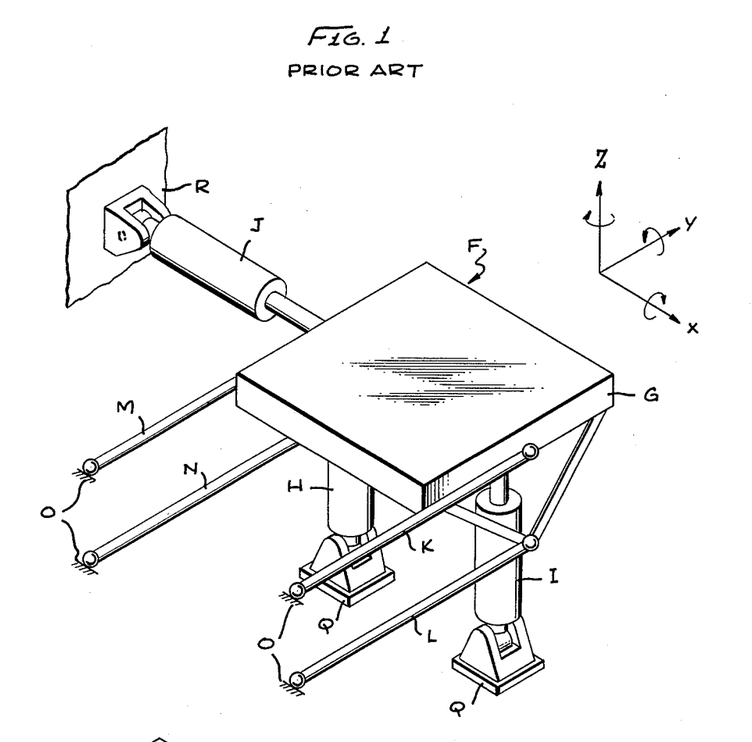
FIG. 1 is a perspective view of a vibration table of the coupled type, which is constructed in accordance with the prior art.

FIG. 1 illustrates a coupled bi-axial shake table system F which is utilized to produce controlled vibration of a table G and any work-piece lying thereon, along the Z and X directions, while preventing motion along the Y direction and also preventing rotation about any one of the three axis directions. In many cases the Z axis is vertical and the X and Y axes horizontal, although this is not necessary in all cases. The table of FIG. 1 is actuated along the vertical Z axis by a pair of hydraulic actuators H, I, which must be precisely synchronized to prevent pitch rotation about the Y axis. A horizontal actuator J produces controlled horizontal motion along the X axis. Displacements in the remaining three degrees of freedom—translation along the Y axis and rotations about the Z and X axes—prevented by four horizontal links K, L, M, N. The four links K–N extend parallel to the Y axis when the table is in its center position. The inner ends of the links are connected to a vertical reaction mass, indicated at O, by four universal joints, and their outer ends are connected to the table G by four other universal joints. Although the system F is relatively simple, it has several disadvantages, including a tendency to low frequency vibrations in the operating range, which is largely due to the compressibility of hydraulic fluid in the two vertical actuators H, I. Also the table undergoes slight arcing motions due to the pivotal mounting of the ends of the links K–M, which may be undesirable in certain critical applications. It also may be noted that the links K–M require a third vertical reaction mass O which is in addition to the other reaction masses at Q and R.

Figure 2:
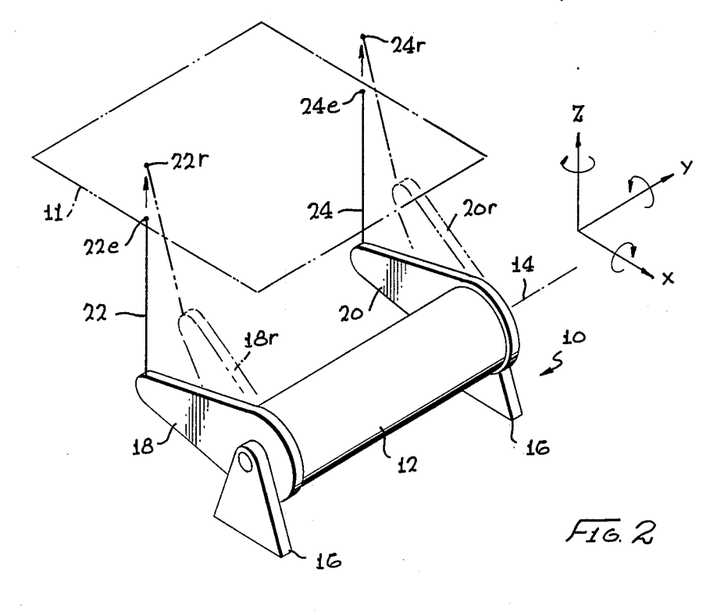
FIG. 2 is a simplified partial perspective view of a motion limiting apparatus constructed in accordance with the present invention.

FIG. 2 illustrates a motion-preventing apparatus 10, which can be referred to as a torque tube assembly or torque device, that can be coupled to a table 11 to prevent rotation of the table about a particular axis X, in a manner that avoids arcing motions of the table or the need for an additional reaction mass. The torque tube assembly includes a tube 12 which is mounted to rotate about a horizontal axis 14, as by the use of a pair of trunnion mounts 16 fixed to a horizontal reaction mass. A pair of arms 18, 20 are fixed to the opposite ends of the tube 12, and a pair of links 22, 24 extend from the outer ends of the arms 18, 20 to locations on the table 11. The lower and upper ends of the links 22, 24 are pivotally mounted respectively to the arms and table.

When the table 11 moves upward along (parallel to) the Z axis, the upper ends of the links move from the positions 22, 24 to the raised positions 22r, 24r. The arms then pivot to positions 18r, 20r, causing slight tilting of the links in the process, to permit the table to be raised. With the axis 14 of the torque tube extending parallel to the Y axis, the torque tube assembly prevents pivoting of the table about the X axis. Any such pivoting of the table about the X axis would require one of the arms such as 18 to move up while the other arm 20 moves down, and this would require twisting of the tube 12. A relatively light-weight tube 12 of large diameter can be made very resistant to any such twisting deformation, and therefore the tube strongly resists any rotation of the table about the X axis.

Figure 3:
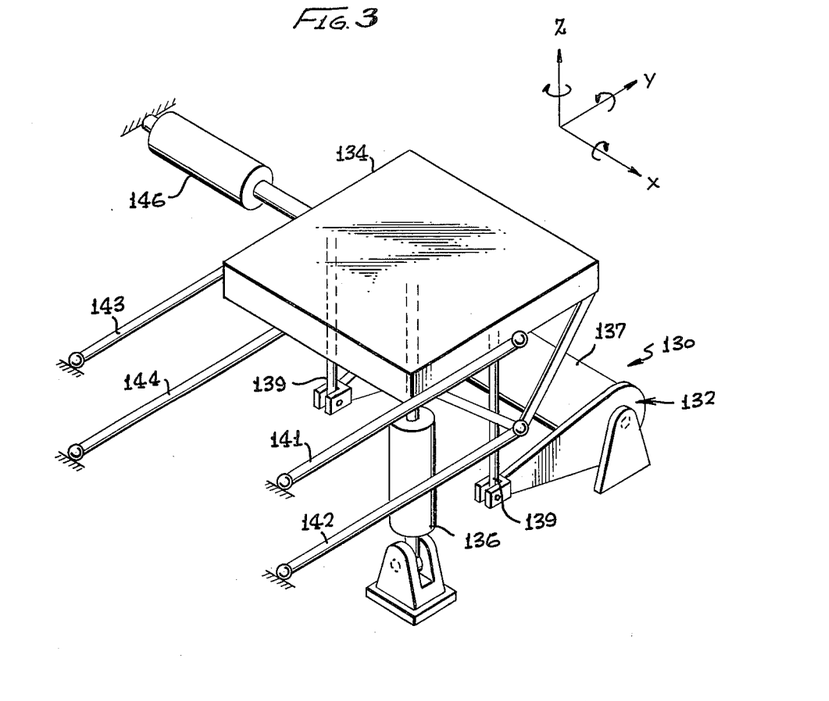
FIG. 3 is a simplified perspective view of a biaxial vibration table system constructed in accordance with another embodiment of the invention which utilizes the motion limiting apparatus of FIG. 2.

FIG. 3 illustrates a biaxial table system 130 which functions in a manner similar to the system of FIG. 1, but which utilizes a torque tube device 132 to stabilize the table 134 against rotation about the Y axis, so that a single actuator 136 can be utilized to produce vertical motion. The torque tube device 132 includes a torque-resistant member 137 rotatably mounted about a horizontal axis and a pair of largely vertical links 139 connecting the ends of the member to the table. The system 130 is otherwise similar to that of FIG. 1, in that it utilizes four links 141–144 extending largely parallel to the Y axis to prevent rotation about the Z and X axes, and a horizontal actuator 146 to produce horizontal motion along the X axis. The system 130 has the important advantages, as compared to the system of FIG. 1, of eliminating one of the vertical actuators, eliminating the need for a control to closely synchronize a pair of vertical actuators, and avoiding vibrations about the Y axis that can take place because of the compressibility of hydraulic fluid where a pair of parallel actuators are used.

Figure 4:
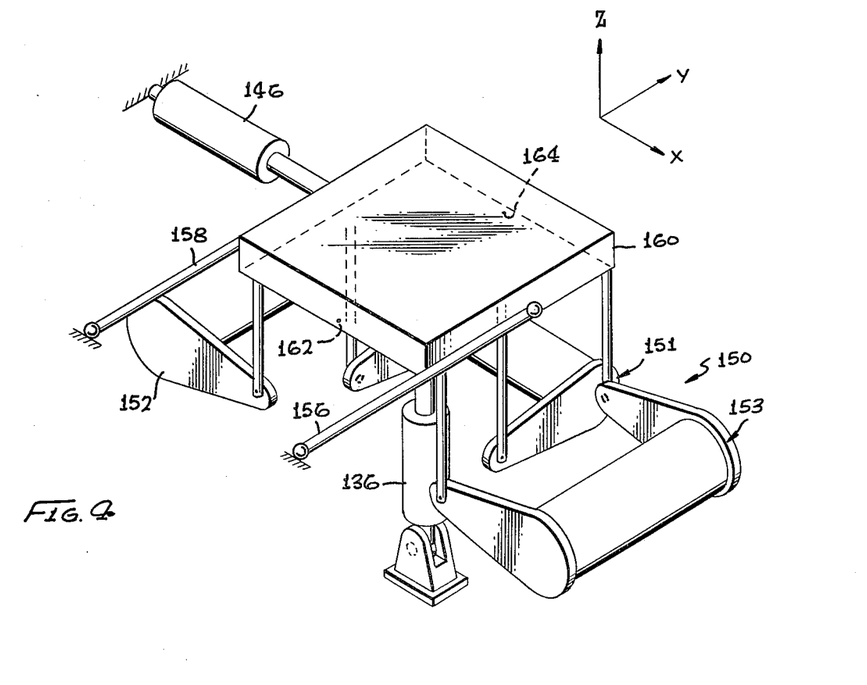
FIG. 4 is a simplified perspective view of a biaxial vibration table system constructed in accordance with another embodiment of the invention.

FIG. 4 illustrates a biaxial system 150 which utilizes three torque tube devices 151–153 and only two anti-rotation links 156, 158. The system is similar to that of FIG. 3, except that the two torque tubes 152, 153 prevent rotation about the X axis, and thereby eliminate the need for two of the links shown at 142 and 144 in FIG. 3 and the need for a depending table structure to space those links from the other two links 141, 143. It is possible to substitute a single torque tube device for the devices 152 and 153, by positioning a single torque tube device so its links are connected to the table on opposite sides of the table axis, such as at the points 162 and 164. However, the other torque tube device 151 blocks much of the needed space. It is possible to use only two torque tube devices by using devices of very different length to fit them into position, or by locating one torque tube device below the level of the other and using longer links extending up to the table, but these approaches tend to degrade the system.

Figure 5:
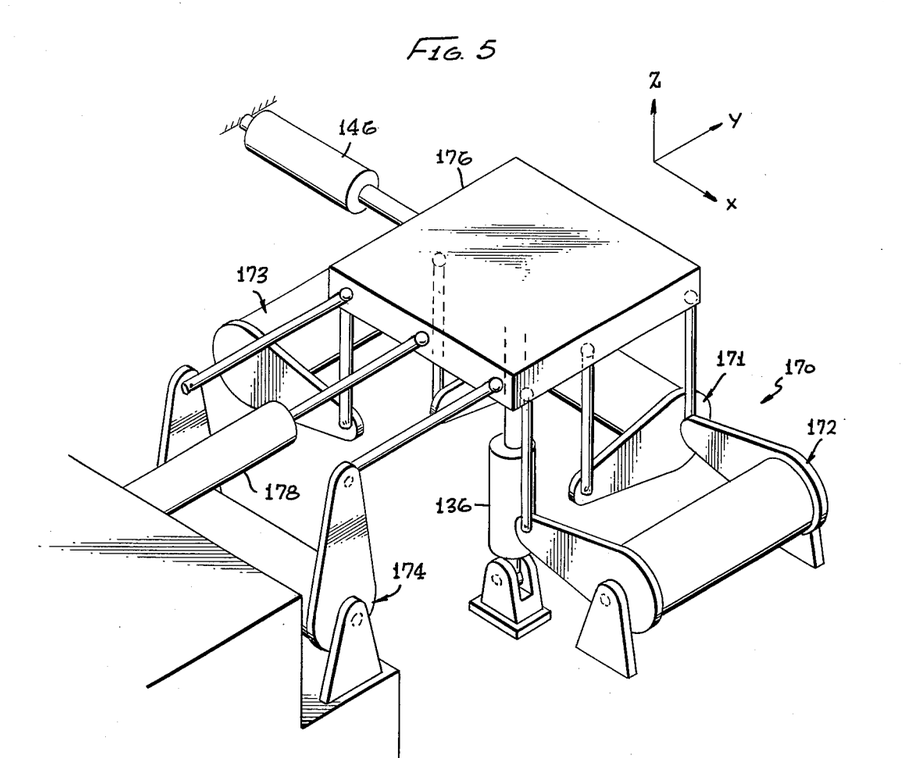
FIG. 5 is a simplified perspective view of a triaxial vibration table system constructed in accordance with another embodiment of the invention.

FIG. 5 illustrates a triaxial system 170 which utilizes four torque tube devices 171–174. The additional torque tube device 174 prevents rotation of the table 176 about the Z axis, while allowing linear motion along the Y axis which is generated by a third actuator 178.

Figure 6:
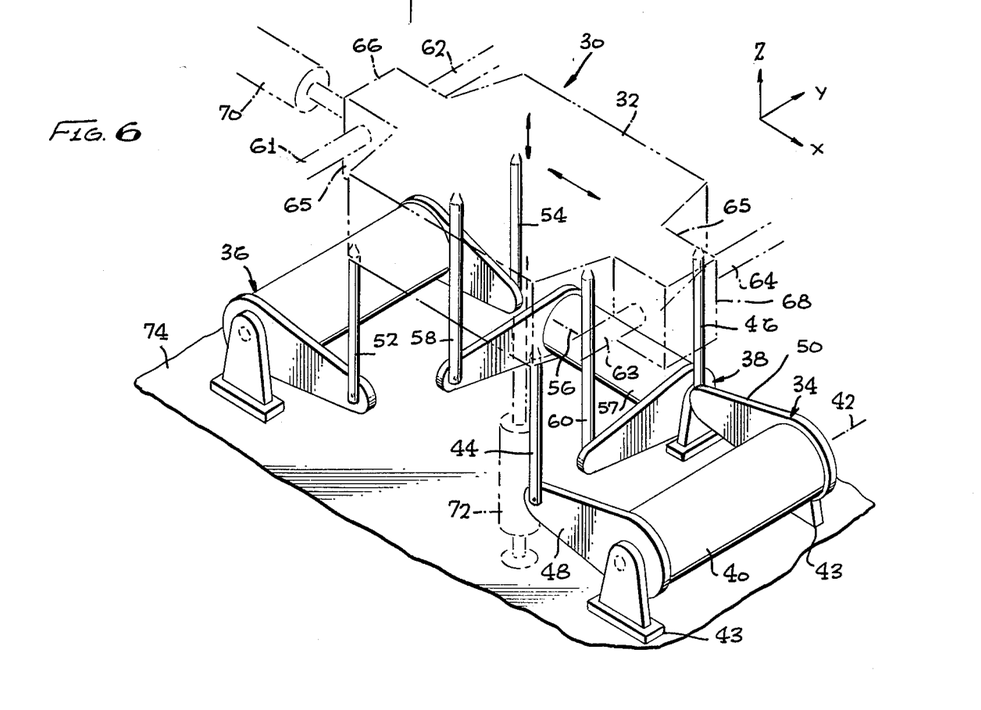
FIG. 6 is a top-perspective view, partially in phantom lines, showing a vibration table system which utilizes the motion limiting apparatus of FIG. 2.

FIG. 6 illustrates some of the details of a vibration or shake-table system 30 which utilizes three torque tube devices of the type shown in FIG. 2, to restrict movement of a specimen-holding table 32 that can hold a workpiece to be tested. The system of FIG. 6 is somewhat similar to that of FIG. 4, except that it avoids arcing movement of the table by utilizing slider bearings at 61–64 in place of the pivotally mounted links 156 and 158 of FIG. 4. It also may be noted that the slider bearings are useful to withstand very high loads in certain specialized applications. The following description of the system of FIGS. 6–11 describes the operation of the torque devices in one application, in some detail.

The table system 30 of FIG. 6 is designed to test a specimen in the same degrees of freedom as the coupled table of FIG. 1. That is, the system 30 translates the table along the Z and X axes (i.e. along lines parallel to these axes), while resisting translation along the Y axis and rotation about any one of the three axes. The system includes three torque tube devices 34, 36, 38, of which two—34, 36—are utilized to prevent table rotation about the Y axis. The torque tube device 34 includes a tube 40 with its axis 42 extending along the Y axis and rotatable thereabout on a support formed by a pair of trunnions 43, and a pair of largely vertical links 44, 46 connecting arms 48, 50 at the tube ends to the table. The trunnions 43 include heavy duty bearings and sturdy brackets for rigid mounting to a reaction mass. The other torque tube device 36 is simlarly constructed, with its links 52, 54 joined to corners of the table opposite those to which the links 44, 46 are joined. Although a single torque tube device 34 could be utilized to prevent table rotation about the X axis, the design of FIG. 6 does not permit the links to lie on opposite sides of the center of the table, and therefore two separate torque tube devices 34, 36 are utilized to provide anti-rotation forces at both ends of the table.

The third torque tube device 38 is mounted with its axis of rotation 56 of its tube 57 extending parallel to the X axis, and with its links 58, 60 extending vertically to locations on opposite sides of the center of the table 32. The torque tube device 38 therefore prevents rotation of the table about the Y axis. Thus, the three torque tube devices prevent rotation about any horizontal axis X, Y while avoiding interference with any other freedom of movement of the table.

The table 32 is prevented from translating along the Y axis by four bearing pads 61-64 that slidably engage flat guide surfaces 65. The guide surfaces 65 lie in planes normal to the Y axis, and are formed on a pair of projections 66, 68 at the ends of the table. The four bearing pads 61-64 also prevent rotation of the table about the Z axis. Motion of the table along the X axis is generated by a horizontal hydraulic actuator 70, while translation along the Z axis is produced by a vertical hydraulic actuator 72.

It may be noted that a single vertical actuator 72 is utilized to produce vertical movement of the table 32, as compared to the use of two actuators in the prior art cascade table of FIG. 1. A single vertical actuator 72 can be utilized in the system of FIG. 3, because the torque tube device prevents rotation about the Y axis without interfering with any other degree of freedom of the table. The use of a single vertical actuator 72 is of considerable advantage, because the need for two synchronized actuators to produce vertical motion without rotation about the Y axis, has been an important disadvantage of the prior art table of FIG. 1. As discussed above, the appreciable compressibility of the hydraulic fluid in the two actuators has permitted low frequency vibrations about the Y axis in the prior art system, which has been highly disadvantageous. Of course, the single actuator 72 not only eliminates the need for an additional actuator, but also eliminates the need for a control system to synchronize two actuators. In addition, the absence of table arcing results in only low forces normally being applied to the four bearing pads 61-64, so that the reaction mass for them can be formed as a structure that is mounted on the same horizontal reaction mass 74 to which the torque tube assemblies are mounted. It may be noted that it is possible to utilize an actuator that operates by pivoting one of the torque tubes such as tube 57. However, this normally would not provide the shortest and stiffest path to enable close control of table movement.

Figure 7:
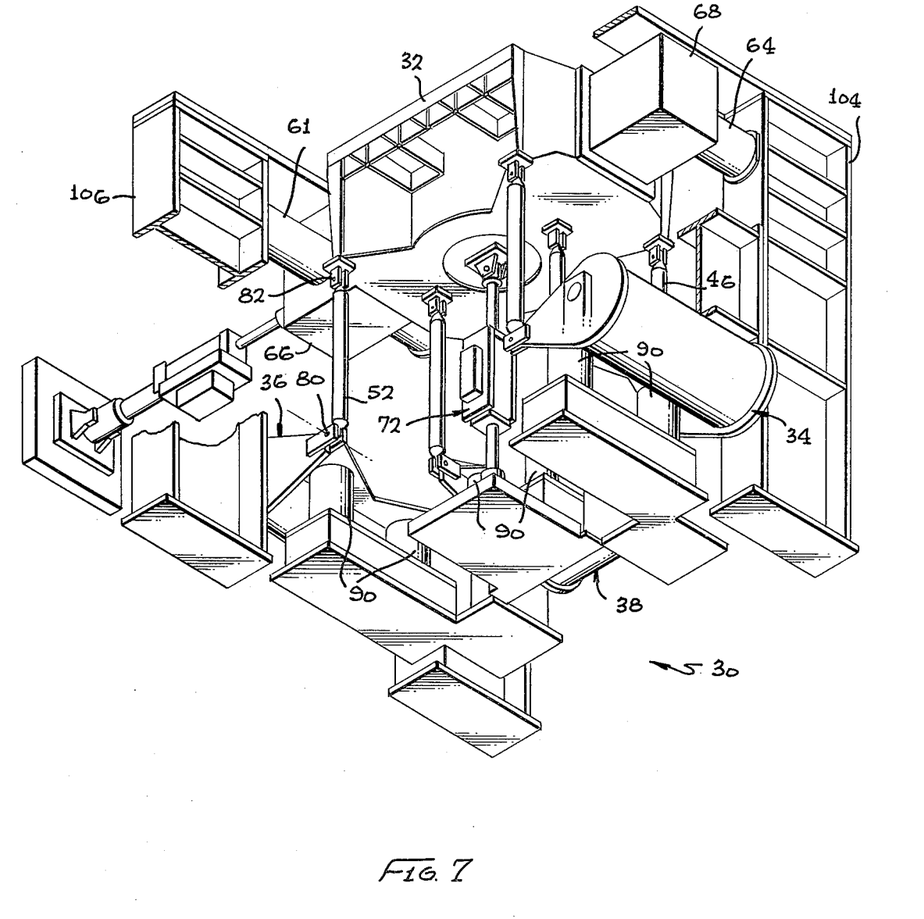
FIG. 7 is a more detailed bottom perspective view of the vibration table system of FIG. 6.
Figure 8:
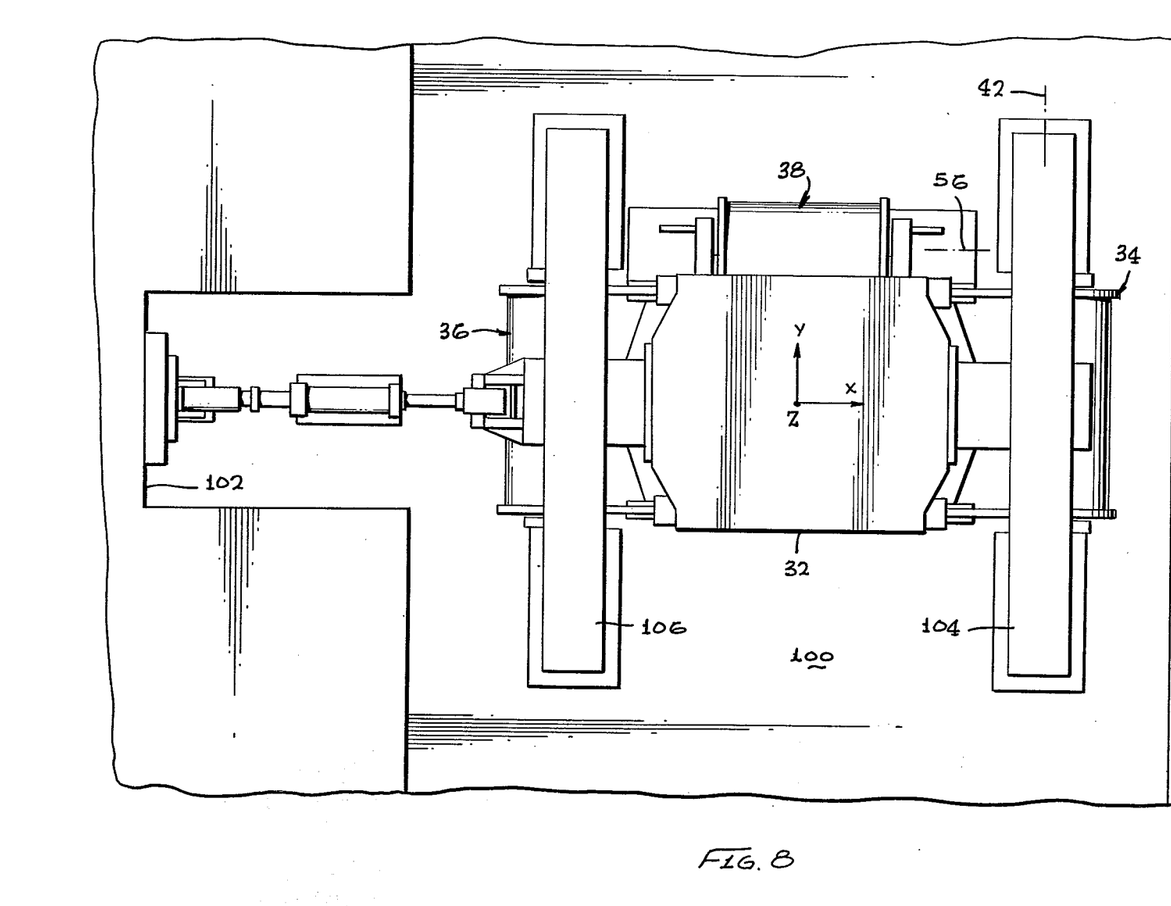
FIG. 8 is a plan view of the apparatus of FIG. 7.
Figure 9:
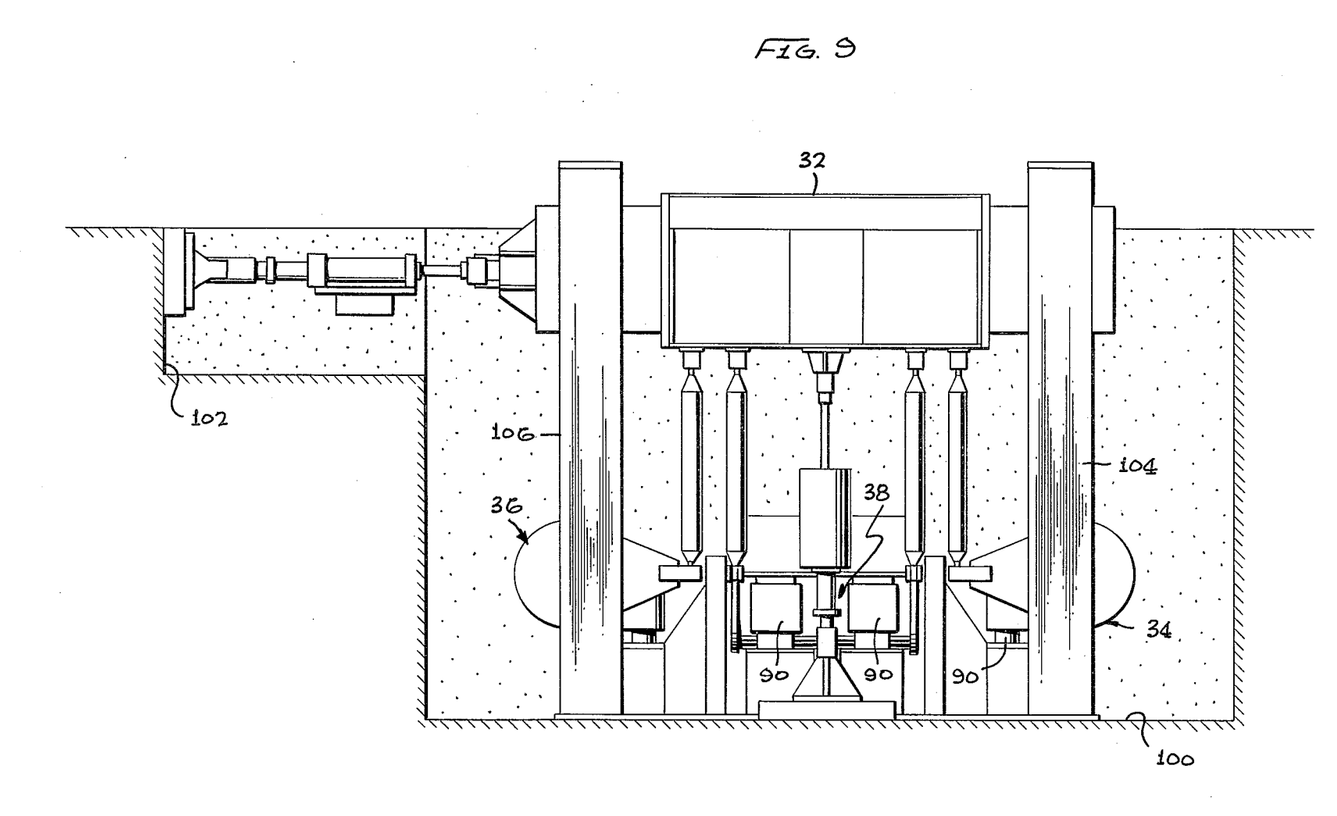
FIG. 9 is a front elevation view of the apparatus of FIG. 8.
Figure 10:
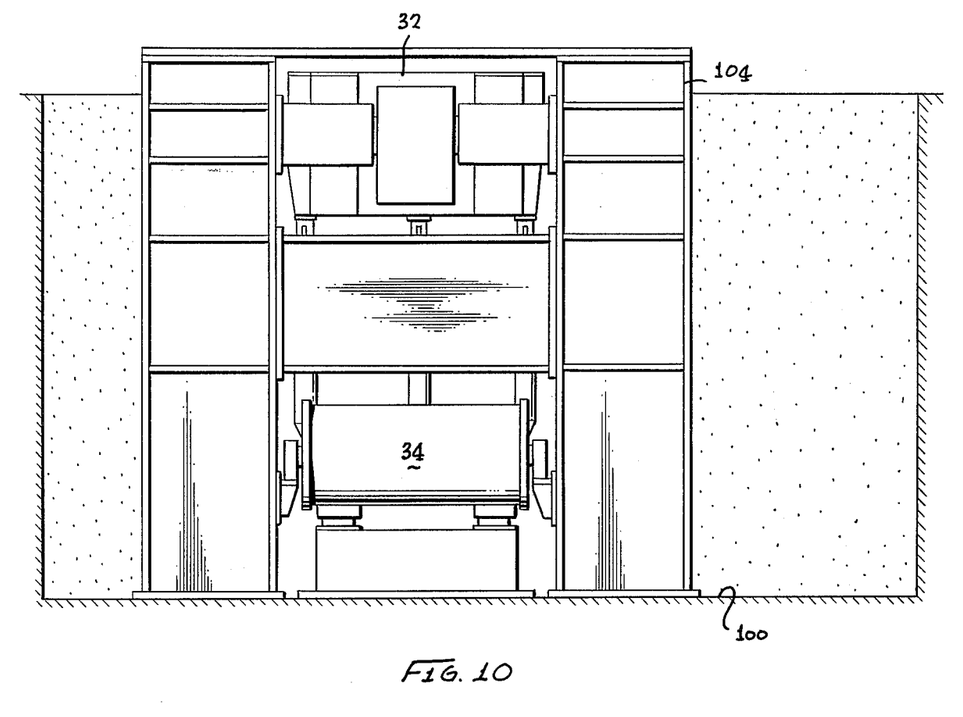
FIG. 10 is a side elevation view of the apparatus of FIG. 9.
Figure 11:
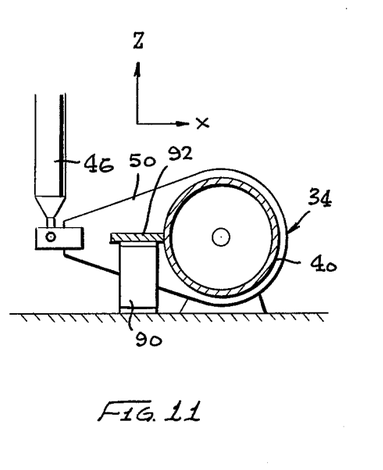
FIG. 11 is a partial sectional view of one of the torque tube devices of the apparatus of FIG. 7.

In the vibration table system 30, which is shown in greater detail in FIG. 7, pivot bearings 80, 82 are utilized at the lower and upper ends of each of the links such as 52. The bearings 80, 82 are preferably ball joints or universal joints, to allow tolerance for misalignment in the case of the bearings for devices 34, 36, and to permit some pivoting during operation of the system in the case of device 38.

The weight of the table 32 and any test specimen thereon could cause non-reciprocal loading of the vertical actuator 72, so that it would have to apply a much larger force to raise the table than to lower it. Air bags such as those shown at 90 in FIG. 7 are utilized to apply an upward force, through their corresponding torque tubes, to the links 52 and therefore to the table 32. This upward force counteracts much of the weight of the table and any workpiece thereon, so that less weight must be borne by the actuator 72. The use of air bags is a common practice in the prior art, but such air bags typically have been subjected to most if not all of the movements of the table, and in the same amount. In accordance with one aspect of the present invention, the air bags are coupled to the torque tube assembly, as in the manner shown in FIG. 11, to isolate the air bags 90 from almost all but vertical movements. An air bag-engaging member 92 is fixed to the tube 40, so that the member 92 moves up and down when the tube 40 undergoes small rotations. The air bag 90 applies an upward force to the member 92, which is translated to an upward force on the link 46 that extends up to the table. Although the table may undergo considerable movements in the X direction, and the link 46 will tilt accordingly, such movement is not transmitted to the air bag 90. By isolating the air bag 90 from sideward movement, the lifetime of the air bag can be increased. The air bag, which is designed primarily to apply vertical forces, can be damaged by repeated lateral shifts, and the elimination of these lateral shifts avoids this source of harm to the air bags.

It may be noted that by coupling the air bag 90 through the torque tube assembly 34, a simple means is provided to effectively multiply bag movement. That is, in FIG. 11 a given vertical movement of the link 46 will produce only half as much vertical movement of the air bag 90 along its axis. In vibration tables wherein large excursions such as 18 inches of movement in any direction are to be encountered, this reduction of air bag movement is useful, since air bags are more easily constructed to apply larger forces but along somewhat smaller excursions.

The vibration table system 30, which is shown in detail in FIGS. 7-10, can be constructed by using primarily a horizontal base reaction mass 100 and one vertical reaction mass 102. The bearing pads 61-64 which guide the table in translation along the X axis, can be mounted on secondary reaction structures 104, 106 which, due to relatively light loading, can be in turn mounted on the horizontal primary reaction mass 100. In one system that has been designed of the type shown in FIGS. 7-10, a table 32 of six feet width and seven feet length was designed to be moved up to 18 inches along the X and Z directions, utilizing torque tube assemblies of the relative sizes illustrated.

Figure 12:
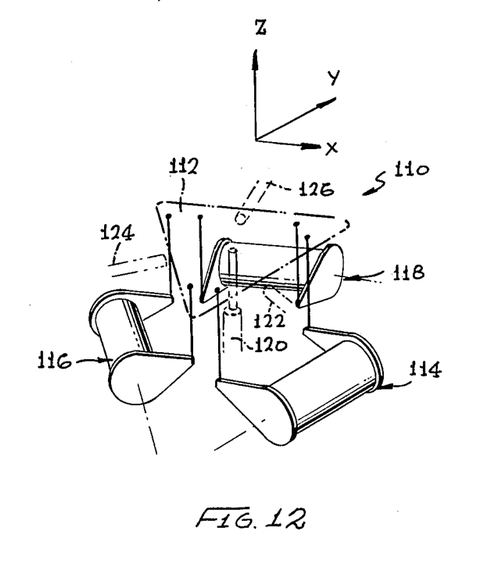
FIG. 12 is a simplified perspective view of a vibration table apparatus constructed in accordance with another embodiment of the invention.

FIG. 12 illustrates a portion of a vibration table system 110 constructed to prevent rotation of a table 112 about any axis and translation along any axis except the Z, or vertical axis. The system includes three motion preventing, or torque tube assemblies 114, 116, and 118 arranged with their axes all horizontal but angled by 60 degrees from one another so their axis lie along a triangle, such as an equilateral triangle. The three torque tube assemblies prevent rotation of the table about any horizontal axis including the X and Y axes. A single vertical actuator 120 can be utilized to produce vertical oscillation of the table. The prevention of rotation about the Z axis, as well as prevention of translation along the X and Y directions, can be accomplished by the use of various devices, such as by the use of three bearing pads 122, 124, 126 which can bear against flat faces formed along three sides of the table.

Thus, the invention provides an apparatus for preventing motion of a table or other object about a predetermined axis, without obstructing other degrees of freedom of the object, which is of relatively simple construction. The motion preventing apparatus includes a torque member which resists twisting about a predetermined torque axis about which it is rotatably mounted by a support, and a pair of rigid links having first (usually lower) ends connected to opposite ends of the torque member at locations spaced from the axis of rotation thereof, and second (usually upper) ends pivotally connected to the table or other object. A large diameter cylindrical tube can serve as the torque member, since such a tube efficiently utilizes material in preventing torque and is easily manufactured. The motion resisting, or torque tube assembly or device, formed by the torque member and links, can be utilized in combination with one or more additional torque tube assemblies and other motion resisting devices, to form a shake-table or other limited motion system, of closely controlled characteristics and relatively simple construction.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. Apparatus for preventing motion of a table or other object in rotation about a predetermined X axis, comprising:
   a torque member with opposite end portions, which is rigid against twisting about a predetermined torque axis;
   a support which supports said torque member in pivoting about said torque axis, and with said torque axis extending largely parallel to a predetermined Y axis which extends perpendicular to said X axis; and
   a pair of substantially rigid and parallel links extending primarily parallel to a predetermined Z axis which extends perpendicular to the X and Y axes, said links having inner ends pivotally connected to opposite end portions of said torque member at locations spaced from said torque axis and outer ends pivotally connected to locations on said object.

2. The apparatus described in claim 1 wherein:
   said torque member includes a largely cylindrical tube and a pair of arms fastened to opposite ends of the tube and extending radially beyond the radius of the tube.

3. The apparatus described in claim 1 wherein:
   said object comprises a table with opposite ends and includes a pair of flat parallel guide surfaces at each table end, said guide surfaces lying in planes normal to said Y axis and the surfaces of each pair facing in opposite directions along said Y axis; and including
   four slider bearing pads disposed against said four guide surfaces to prevent table movement along the Y axis and rotation about the Z axis.

4. The apparatus described in claim 1 including:
   a second torque member which is rigid against twisting about a second torque axis;
   a support which supports said second torque device in pivoting about said second torque axis, and with said second torque axis extending parallel to said X axis; and
   a second pair of links extending primarily parallel to said Z axis and having opposite ends pivotally connected respectively to said object and to opposite end portions of said second torque member.

5. The apparatus described in claim 1 including:
   a single hydraulic actuator extending primarily parallel to said links and having an inner end supported against movement in said Z axis and an outer end pivotally coupled to said object, whereby the assembly formed by the torque member, support, and links enables a single actuator to be used for Z axis movement.

6. The apparatus described in claim 1 including:
   actuator means for reciprocating said object in a direction primarily parallel to said Z axis; and
   air bag means coupled to said torque member to urge its rotation in a predetermined direction, whereby to isolate the air bag means from some object movements.

7. The apparatus described in claim 6 wherein:
   said air bag means is coupled to a torque member location closer to the torque axis than the inner ends of said links, whereby to reduce the stroke of the air bag means.

8. Apparatus for supporting a table, which is mountable adjacent to a reaction mass, and producing table movement along a predetermined vertical Z axis, while preventing table rotation about horizontal axes, comprising:
   a plurality of torque devices, each having a torque member which has opposite end portions and which is rigid against twisting about a predetermined torque axis, and each having a support which supports the torque member in pivoting about said torque axis; said supports mounted on said reaction mass with the torque axes of their corresponding torque members extending horizontally but at angles from one another as viewed along the Z axis;
   a plurality of pairs of links, each pair having lower ends pivotally connected to opposite end portions of one of said torque members and upper ends pivotally connected to said table; and
   a linear actuator having upper and lower ends respectively connected to said table and said reaction mass, to move said table vertically.

9. The apparatus described in claim 8 including:
   a horizontal linear actuator positioned to move said table along a predetermined horizontal X axis;
   four flat vertical surface regions lying in planes parallel to said X axis; and
   four bearing pads disposed against said surfaces, whereby to also prevent horizontal motion perpendicular to said X axis and rotation about the vertical Z axis, while producing motion along the X axis.

10. Apparatus for preventing pivoting of an object about a predetermined X axis, comprising:
    a torque tube having a tube axis oriented primarily perpendicular to said X axis, and pivotally mounted to pivot about said tube axis; and
    link means connecting spaced locations on said torque tube to similarly spaced locations on said object, each of said link means pivotally connected to the tube about second axes that are spaced from the tube axis.

11. The apparatus described in claim 10 including:
    an air bag device having one end supported against movement and an opposite end connected to said torque tube at a location spaced from said tube axis, whereby to at least partially isolate the air bag from table movement while enabling the transmission of certain forces between them.

12. Apparatus for supporting a table (134, FIG. 3) and producing table movement comprising:
    a vertical actuator (136) centered on said table to move it vertically;

a horizontal actuator (146) connected to said table to move it along a predetermined horizontal axis;

four largely horizontally-extending links (141, 142, 143, 144) extending primarily perpendicular to said predetermined horizontal axis, said links having outer ends pivotally connected to said table and having pivotally supported inner ends, said links arranged with a pair of links at opposite ends of said table and with the two links of each pair being vertically spaced, to permit horizontal table movement by said horizontal actuator while preventing rotation about a vertical axis and about said predetermined horizontal axis; and a torque device (132) which includes a torque resistant member (137) rotatably mounted about an axis parallel to said predetermined axis and having a pair of links (139) with lower ends pivotally connected to the ends of said member and upper ends pivotally connected to said table.

13. Apparatus for supporting a table (160, FIG. 4) and producing table movement comprising:

a vertical actuator (136) connected to said table to move it vertically;

a horizontal actuator (146) connected to said table to move it horizontally;

at least two torque devices (151, 153), which each include a torque resistant member rotatable about a horizontal axis and a pair of links extending largely vertically from the ends of the torque resistant member to the table, and with the axes of rotation of the torque resistant members angled from one another; and a pair of links (156, 158), each extending largely horizontal and perpendicular to said horizontal actuator, and each having an outer end pivotally connected to an opposite end of said table and a pivotally mounted inner end.

14. Apparatus for supporting a table (176, FIG. 5) and producing table movement, comprising:

three actuators (136, 146, 178) connected to said table to move it along three perpendicular directions;

at least two torque devices (171, 172), which each include a torque resistant member rotatable about a substantially horizontal axis and a pair of links extending largely vertically from the ends of the torque resistant member to the table, and with the axes of rotation of the torque resistant members angled from one another; and a third torque device (174) having a torque resistant member rotatable about a substantially horizontal axis and a pair of links extending largely horizontally from the ends of the member to the table.

* * * * *